(12) United States Patent
Mehta et al.

(10) Patent No.: US 8,387,085 B2
(45) Date of Patent: Feb. 26, 2013

(54) METHODS AND SYSTEMS FOR TAILORING AN INTERACTIVE GAME ASSOCIATED WITH A MEDIA CONTENT INSTANCE TO A USER

(75) Inventors: Japan A. Mehta, Coppell, TX (US); Shahzaib Zafar, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 460 days.

(21) Appl. No.: 12/562,572

(22) Filed: Sep. 18, 2009

(65) Prior Publication Data

US 2011/0070942 A1    Mar. 24, 2011

(51) Int. Cl.
*H04N 1/00* (2006.01)

(52) U.S. Cl. ........ 725/28; 725/25; 725/37; 725/60; 463/42

(58) Field of Classification Search ........ 463/9, 16, 463/22–23, 25, 42; 725/24, 40
See application file for complete search history.

(56) References Cited

U.S. PATENT DOCUMENTS

| | | | |
|---|---|---|---|
| 6,287,199 B1* | 9/2001 | McKeown et al. | 463/40 |
| 6,460,036 B1* | 10/2002 | Herz | 707/748 |
| 7,243,365 B1* | 7/2007 | Rahman | 725/109 |
| 7,596,797 B1* | 9/2009 | Kapner et al. | 725/46 |
| 7,617,512 B2* | 11/2009 | Nickum | 725/46 |
| 2002/0034980 A1* | 3/2002 | Lemmons et al. | 463/40 |
| 2002/0088009 A1* | 7/2002 | Dukiewicz et al. | 725/136 |
| 2004/0003410 A1* | 1/2004 | Van Noetsele | 725/105 |
| 2004/0048644 A1* | 3/2004 | Gerrard et al. | 463/16 |
| 2007/0067805 A1* | 3/2007 | Macrae et al. | 725/58 |
| 2007/0074250 A1* | 3/2007 | Furukawa | 725/40 |
| 2007/0157249 A1* | 7/2007 | Cordray et al. | 725/58 |
| 2008/0066100 A1* | 3/2008 | Brodersen et al. | 725/35 |
| 2008/0155633 A1* | 6/2008 | Watson | 725/114 |
| 2008/0242423 A1* | 10/2008 | Kerr et al. | 463/42 |
| 2008/0261680 A1* | 10/2008 | Buecheler et al. | 463/23 |
| 2009/0005141 A1* | 1/2009 | Lehtiniemi et al. | 463/9 |
| 2009/0156179 A1* | 6/2009 | Hahn et al. | 455/414.1 |
| 2009/0186694 A1* | 7/2009 | Gunawardana et al. | 463/31 |
| 2009/0280891 A1* | 11/2009 | Filipour et al. | 463/22 |
| 2010/0004055 A1* | 1/2010 | Gormley et al. | 463/25 |
| 2010/0115559 A1* | 5/2010 | Ellis | 725/53 |
| 2010/0162343 A1* | 6/2010 | Roberts et al. | 725/136 |
| 2010/0333127 A1* | 12/2010 | Scott et al. | 725/24 |

OTHER PUBLICATIONS

Chris Pruett, Defining the All-Important Difficulty Curve, The Journal of Education, Community, and Value, vol. 8, Issue 1, Jan.-Feb. 2008, http://bcis.pacificu.edu/journal/article.php?id=162.*

* cited by examiner

*Primary Examiner* — Dmitry Suhol
*Assistant Examiner* — Jason Yen

(57) ABSTRACT

An exemplary method includes maintaining a user profile associated with a user of a media content access subsystem, presenting, by the media content access subsystem, a media content instance and an interactive game associated with the media content instance to the user, and tailoring the interactive game to the user in accordance with the user profile. Corresponding methods and systems are also disclosed.

21 Claims, 14 Drawing Sheets

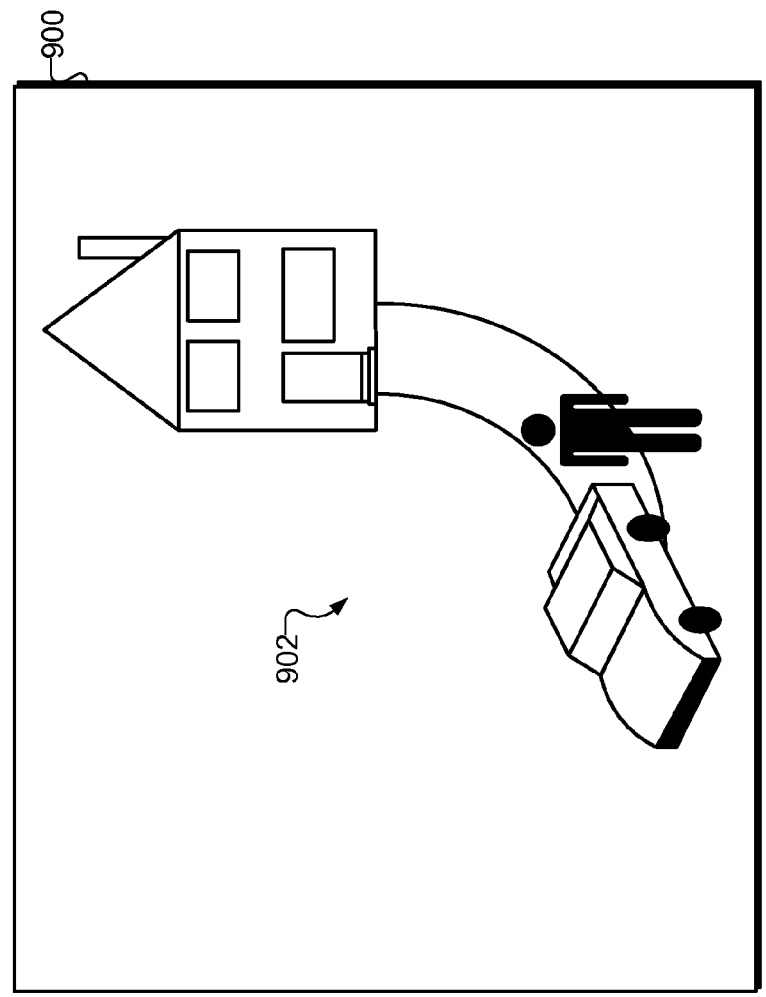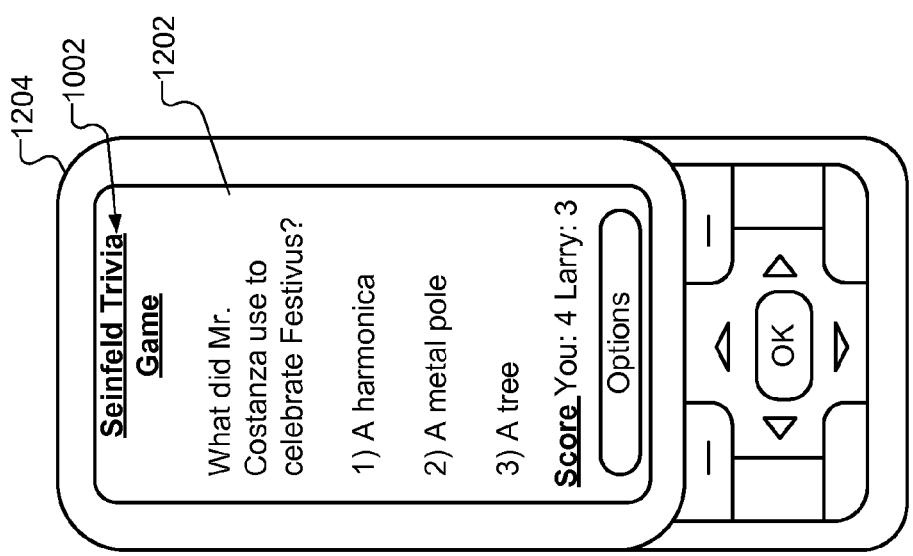
Fig. 12

METHODS AND SYSTEMS FOR TAILORING AN INTERACTIVE GAME ASSOCIATED WITH A MEDIA CONTENT INSTANCE TO A USER

BACKGROUND INFORMATION

Set-top boxes and other media content access devices are often configured to provide users with access to a large number and variety of media content choices. For example, a user may choose to experience a variety of broadcast television programs, pay-per-view services, video-on-demand programming, and audio programming via a set-top box.

In some instances, a user may desire to participate in an interactive game that is associated with media content available. For example, the user may desire to play a trivia game associated with a particular broadcast television program while watching the television program. However, such interactive games are currently limited in how they can be customized to a particular skill level or interest of a user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 12 illustrates an exemplary configuration wherein a media content instance and an interactive game are displayed on distinct display screens according to principles described herein.

DETAILED DESCRIPTION OF PREFERRED EMBODIMENTS

Exemplary methods and systems for tailoring an interactive game associated with a media content instance to a user are disclosed herein. In some examples, a user profile associated with a user of a media content access subsystem (e.g., a set-top box) is maintained. The user profile may represent one or more personal traits and/or preferences of the user and/or how the user interacts with the media content access subsystem. A media content instance and an interactive game associated with the media content instance are presented to the user. For example, the media content access subsystem may present the media content instance and the interactive game by concurrently or otherwise displaying the media content instance and the interactive game on a display screen. The interactive game is tailored to the user in accordance with the user profile associated with the user. For example, the content and/or type of interactive game presented to the user may be tailored to the user based on one or more personal traits and/or preferences of the user and/or how the user interacts with the media content subsystem as defined by the user profile of the user. In this or similar manner, the methods and systems described herein may customize how an interactive game associated with a media content instance is presented to the user based on the particular likes, dislikes, media content interaction (e.g., viewing) habits and/or tendencies, and/or other traits and/or preferences associated with the user.

As used herein, "media content" may refer generally to any content accessible via a media content access subsystem. The term "media content instance" will be used herein to refer to any television program, on-demand media program, pay-per-view media program, broadcast media program (e.g., broadcast television program), IPTV media content, advertisement (e.g., commercial), video, movie, song, image, photograph, sound, or any segment, component, or combination of these or other forms of media content that may be viewed or otherwise experienced by a user.

As used herein, an "interactive game" may include any game presented to a user by a presentation facility (e.g., by a media content access subsystem having the presentation facility at least partially implemented thereon) and that is associated with a media content instance accessible to the user via the media content access subsystem. For example, an interactive game associated with a media content instance may include, but is not limited to, a trivia game associated with the media content instance and/or one or more actors in the media content instance, a scene detection game associated with the media content instance, a puzzle game associated with the media content instance, a simulated game show game associated with the media content instance, a video game associated with the media content instance, and/or any other type of game associated with the media content instance as may serve a particular application.

Figure 1:
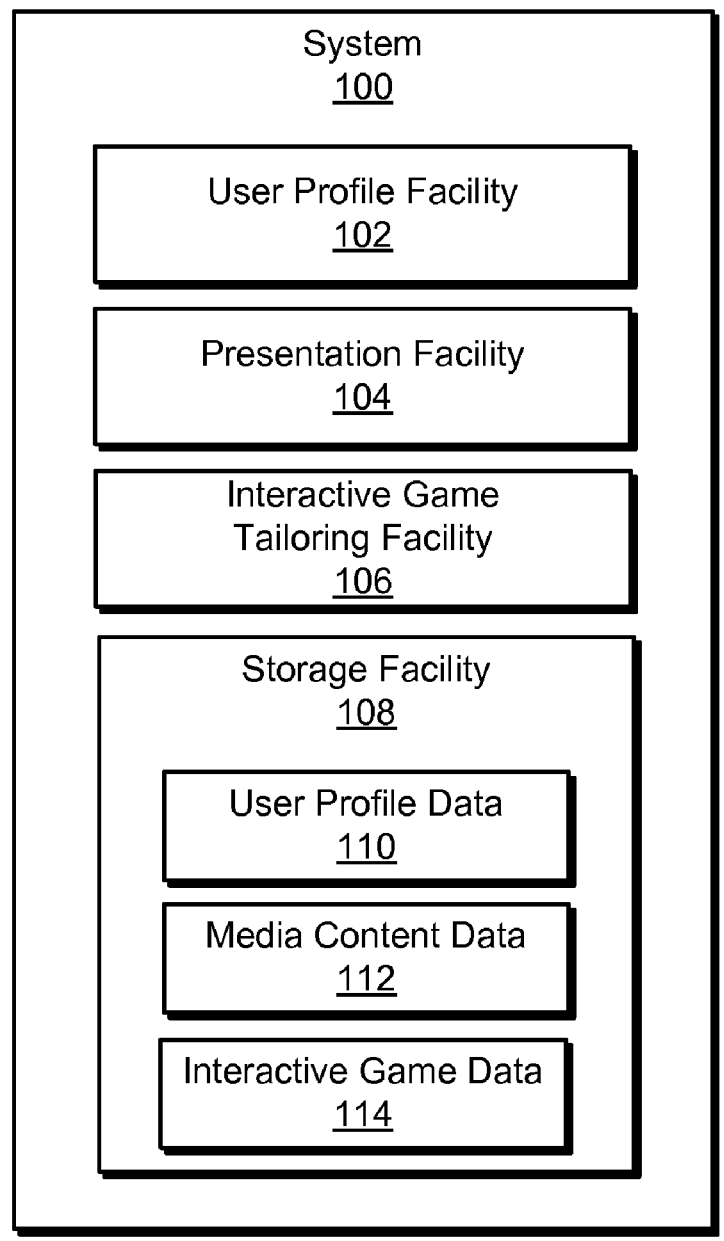
FIG. 1 illustrates an exemplary media content access system according to principles described herein.

FIG. 1 illustrates an exemplary media content access system 100 (or simply "system 100"). As will be described in more detail below, system 100 may be configured to present and tailor an interactive game associated with a media content instance to one or more users of a media content access subsystem (e.g., a set-top box ("STB"), mobile phone, video phone, etc.).

System 100 may include, but is not limited to, a user profile facility 102, a presentation facility 104, an interactive game tailoring facility 106, and a storage facility 108 selectively and communicatively coupled one to another. User profile facility 102 may be configured to maintain a user profile associated with a user of a media content access subsystem. The user profile may represent how the user interacts with the media content access subsystem, one or more personal traits and/or preferences associated with the user, and/or any other information associated with the user as may serve a particular application. In some examples, as will be described in more detail below, a user profile corresponding to a user may be dynamically updated as various interaction events performed by the user are detected by user profile facility 102. Data representative of a user profile may be stored as user profile data 110 in storage facility 108.

Presentation facility 104 may be configured to present a media content instance and an interactive game associated with the media content instance to a user of a media content access subsystem. To this end, storage facility 108 may be configured to maintain media content data 112 representative of one or more media content instances and interactive game data 114 representative of one or more interactive games. Exemplary ways in which presentation facility 104 presents a media content instance and an interactive game associated with the media content instance to a user of a media content access subsystem will be described in more detail below.

Interactive game tailoring facility 106 may be configured to tailor the interactive game to the user of the media content access subsystem in accordance with the user profile maintained by user profile facility 102. By tailoring an interactive game to a user, system 100 may customize how the interactive game is presented to the user based on the particular likes, dislikes, media content interaction (e.g., viewing) habits, and/or other traits associated with the user. For example, interactive game tailoring facility 106 may modify a difficulty level, a content, a type, and/or a duration of an interactive game presented to a user in accordance with a user profile associated with the user. As will be described in more detail below, interactive game tailoring facility 106 may additionally or alternatively tailor an interactive game in accordance with one or more user profiles associated with other users.

As mentioned, storage facility 108 may be configured to maintain user profile data 110, media content data 112, and interactive game data 114. Storage facility 108 may be further configured to maintain any other type of data as may serve a particular application.

System 100, including facilities 102-108, may include any computer hardware and/or computer-implemented instructions (e.g., software), or combinations of computer-implemented instructions and hardware, configured to perform one or more of the processes described herein. In particular, system 100 may be implemented on one physical computing device or may be implemented on more than one physical computing device. Accordingly, system 100 may include any number of computing devices, and may employ any of a number of computer operating systems. Moreover, it will be recognized that although facilities 102-108 are shown to be separate facilities in FIG. 1, any of those facilities may be combined into a single facility as may serve a particular application.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 2:
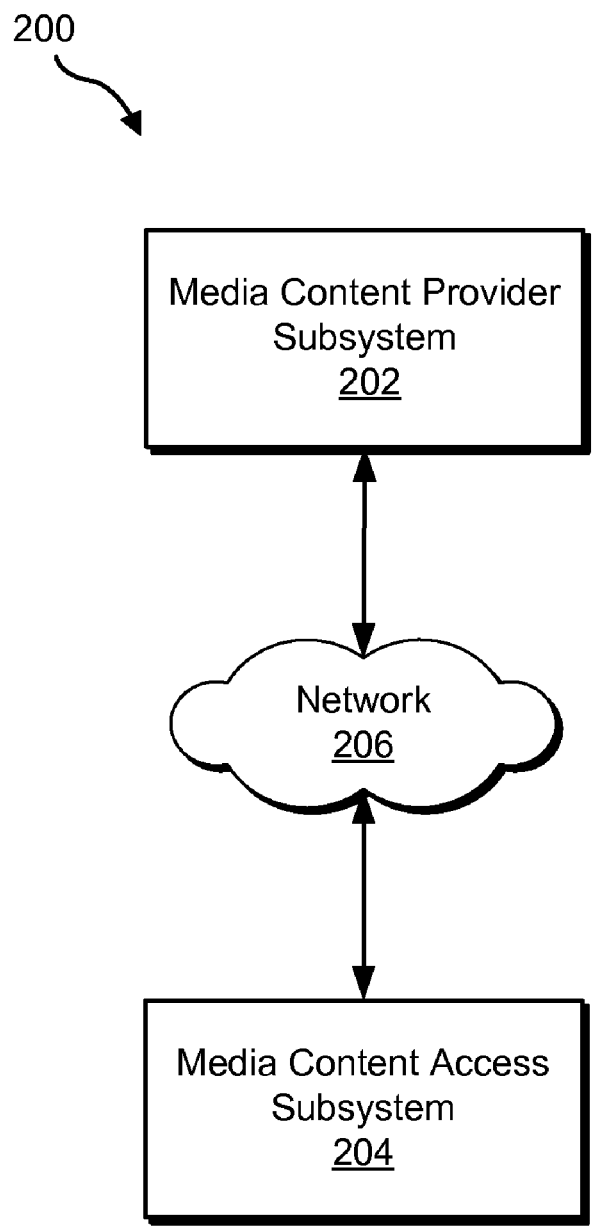
FIG. 2 illustrates an exemplary implementation of the system of FIG. 1 according to principles described herein.

FIG. 2 illustrates an exemplary implementation 200 of system 100 wherein a media content provider subsystem 202 (or simply "provider subsystem 202") is communicatively coupled to a media content access subsystem 204 (or simply "access subsystem 204"). As will be described in more detail below, user profile facility 102, presentation facility 104, interactive game tailoring facility 106, and storage facility 108 may each be implemented on one or both of provider subsystem 202 and access subsystem 204.

Access subsystem 204 may be configured to communicate with and receive a signal and/or data stream containing data representative of media content and/or data associated with media content (e.g., metadata, program guide data, etc.) from provider subsystem 202. Access subsystem 204 and provider subsystem 202 may communicate using any suitable communication technologies, devices, networks, media, and protocols supportive of remote data communications.

For example, as shown in FIG. 2, provider subsystem 202 may be configured to communicate with access subsystem 204 over a network 206 (and communications links thereto). Network 206 may include one or more networks or types of networks capable of carrying communications and/or data signals between provider subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Provider subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

While FIG. 2 shows provider subsystem 202 and access subsystem 204 communicatively coupled via network 206, it will be recognized that provider subsystem 202 and access subsystem 204 may be configured to communicate one with another in any other suitable manner (e.g., via a direct connection). Moreover, it will be recognized that in some examples, system 100 is entirely implemented on access subsystem 204.

In some examples, provider subsystem 202 may be configured to generate or otherwise provide media content (e.g., in the form of one or more media content streams) to access subsystem 204. Access subsystem 204 may be configured to facilitate access by a user to media content received from provider subsystem 202. To this end, access subsystem 204 may present the media content for experiencing (e.g., viewing) by a user, record the media content, parse metadata and/or other data associated with the media content, etc. Presentation of the media content may include, but is not limited to, displaying, playing, or otherwise presenting the media content, or one or more components of the media content, such that the media content may be experienced by the user.

Figure 3:
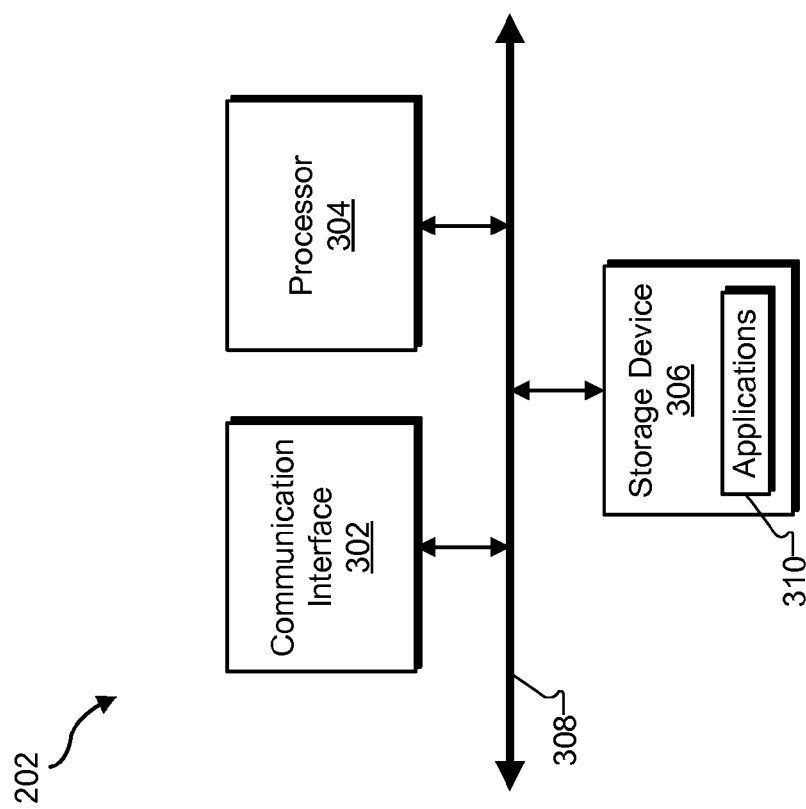
FIG. 3 illustrates exemplary components of a media content provider subsystem according to principles described herein.

FIG. 3 illustrates exemplary components of provider subsystem 202. As shown in FIG. 3, provider subsystem 202 may include a communication interface 302, a processor 304, and a storage device 306 communicatively coupled one to another via a communication infrastructure 308. The components of provider subsystem 202 may communicate with one another, including sending data to and receiving data from one another, using any suitable communication technologies. Moreover, the components of provider subsystem 202 may be implemented on any computing device or combination of computing devices, such as one or more servers, personal computers, or the like.

While an exemplary provider subsystem 202 is shown in FIG. 3, the components illustrated in FIG. 3 are not intended to be limiting. Additional or alternative components may be used in other embodiments. Components of the provider subsystem 202 shown in FIG. 3 will now be described in additional detail.

Communication interface 302 may be configured to communicate with one or more computing devices, including access subsystem 204. In particular, communication interface 302 may be configured to transmit and/or receive communication signals, media content, and/or data to/from access subsystem 204. Examples of communication interface 302 include, without limitation, a wired network interface (such as a network interface card), a wireless network interface (such as a wireless network interface card), a modem, and any other suitable interface. In at least one embodiment, communication interface 302 may provide a direct connection between provider subsystem 202 and access subsystem 204 via a direct link to a network, such as the Internet. Communication interface 302 may additionally or alternatively provide such a connection through, for example, a local area network (such as an Ethernet network), a personal area network, a telephone or cable network, a cellular telephone connection, a satellite data connection, or any other suitable connection.

In some examples, communication interface 302 may be configured to transmit (e.g., broadcast, multicast, and/or narrowcast) data representative of one or more media content instances and/or interactive games associated with the one or more media content instances to access subsystem 204. Such data may be transmitted in one or more media content data streams, as one or more data files, or in any other suitable manner as may serve a particular application. Communication interface 302 may be configured to interface with any suitable communication media, protocols, and formats, including any of those mentioned above.

Processor 304 generally represents any type or form of processing unit capable of processing data or interpreting, executing, and/or directing execution of one or more of the instructions, processes, and/or operations described herein. Processor 304 may direct execution of operations in accordance with one or more applications 310 or other computer-executable instructions such as may be stored in storage device 306 or another computer-readable medium. As an example, processor 304 may be configured to process data, including modulating, encoding, and/or otherwise preparing data (e.g., media content data) for transmission by communication interface 302.

Storage device 306 may include one or more data storage media, devices, or configurations and may employ any type, form, and combination of data storage media and/or device. For example, storage device 306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 306. For example, data representative of one or more executable applications 310 configured to direct processor 304 to perform any of the operations described herein may be stored within storage device 306. In some examples, data may be arranged in one or more databases residing within storage device 306.

In some examples, user profile facility 102, presentation facility 104, interactive game tailoring facility 106, and/or storage facility 108 may be implemented by or within one or more components of provider subsystem 202. For example, one or more applications 310 residing within storage device 306 may be configured to direct processor 304 to perform one or more processes or functions associated with monitoring facility 102, interaction profile facility 104, and/or presentation facility 106. Likewise, storage facility 108 may be implemented by or within storage device 306. For example, user profile data 110, media content data 112, and/or interactive game data 114 may be stored within storage device 306.

Figure 4:
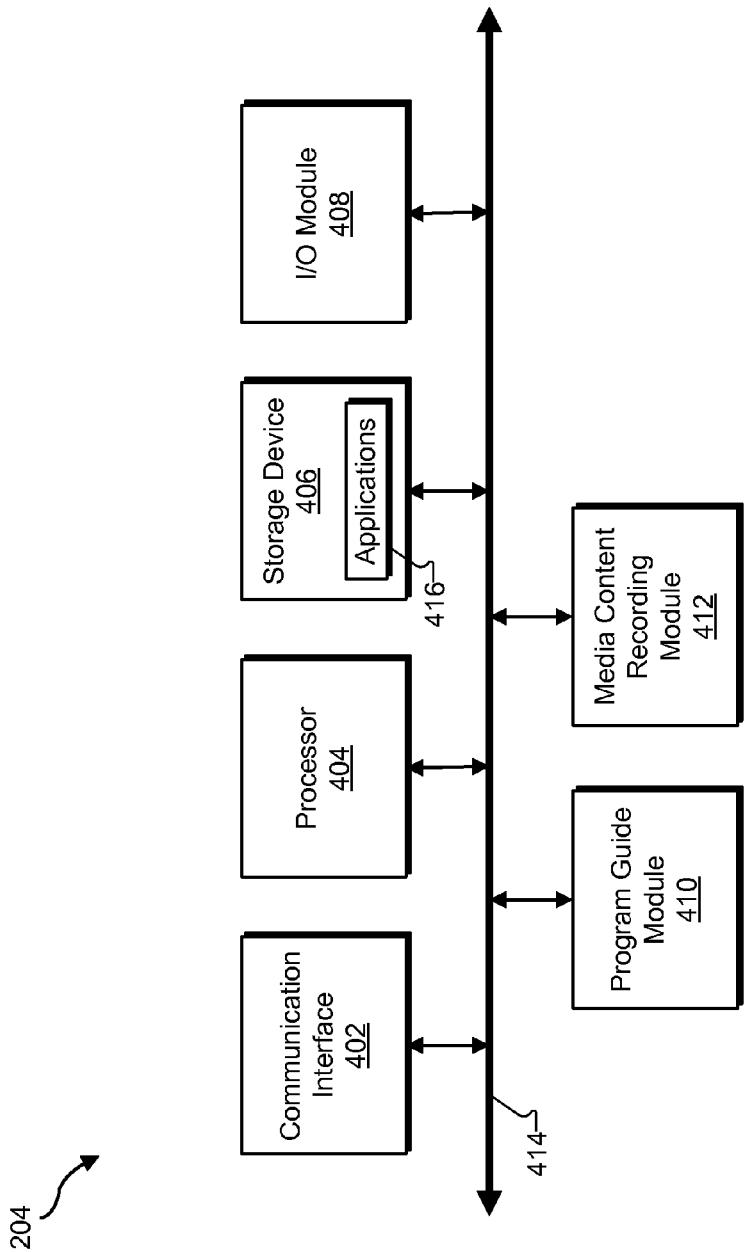
FIG. 4 illustrates exemplary components of a media content access subsystem according to principles described herein.

FIG. 4 illustrates exemplary components of access subsystem 204. As shown in FIG. 4, access subsystem 204 may include a communication interface 402, a processor 404, a storage device 406, an input/output ("I/O") module 408, a program guide module 410, and a media content recording module 412 communicatively coupled one to another via a communication infrastructure 414. The components of access subsystem 204 may communicate with one another, including sending data to and receiving data from one another, using any suitable communication technologies. Moreover, the components of access subsystem 204 may be implemented on any computing device or combination of computing devices, such as a set-top box, a communications device, a mobile device (e.g., a mobile phone device), a handheld device, a personal computer, a phone device (e.g., Verizon Hub device), a personal-digital assistant device, gaming device, digital video recording ("DVR") device (e.g., a personal video recording ("PVR") device), a television device, and/or any media content access device configured to perform one or more of the processes and/or operations described herein.

While an exemplary access subsystem 204 is shown in FIG. 4, the components illustrated in FIG. 4 are not intended to be limiting. Additional or alternative components may be used in other embodiments. Components of the access subsystem 202 shown in FIG. 4 will now be described in additional detail.

Communication interface 402 may be configured to communicate with one or more computing devices, including provider subsystem 202. In particular, communication interface 402 may be configured to transmit and/or receive communication signals, media content, and/or data to/from provider subsystem 202. Examples of communication interface 402 include, without limitation, a wired network interface (such as a network interface card), a wireless network interface (such as a wireless network interface card), a modem, and any other suitable interface. In at least one embodiment, communication interface 402 may provide a direct connection between provider subsystem 202 and access subsystem 204 via a direct link to a network, such as the Internet. Communication interface 402 may additionally or alternatively provide such a connection through, for example, a local area network (such as an Ethernet network), a personal area network, a telephone or cable network, a cellular telephone connection, a satellite data connection, or any other suitable connection.

As mentioned, provider subsystem 202 may transmit (e.g., broadcast, multicast, and/or narrowcast) data representative of one or more media content instances and/or one or more interactive games associated with the one or more media content instances. Communication interface 402 may be configured to receive such data such that the data may be processed by access subsystem 204. To this end, communication interface 402 may include any device, logic, and/or other technologies suitable for receiving signals, data streams, and/or data representative of media content. Communication interface 402 may be configured to interface with any suitable communication media, protocols, and formats, including any of those mentioned above.

In certain embodiments, provider subsystem 202 may be configured to transmit and access subsystem 204 may be configured to receive data streams or signals including data representative of various media content instances in accordance with a transmission schedule. The transmission schedule may specify that particular media content instances are to be transmitted at scheduled transmission times and on certain media content carrier channels. As used herein, the term "scheduled transmission time" or "scheduled transmission" may refer generally to any period of time during which a media content instance is to be transmitted to access subsystem 204. The term "media content carrier channel" or "media content channel" as used herein may refer generally to any carrier of media content, including, but not limited to, media (e.g., television) channels, streams, addresses, frequencies or other carriers of media content.

Communication interface 402 may be configured to selectively identify, receive, and/or process appropriate data streams and/or media content instances at the scheduled transmission times and on the appropriate media content carrier channels. For instance, in certain implementations communication interface 402 may include a tuner configured to selectively receive media content carried on a particular media content carrier channel. The tuner may be tuned to a particular media content carrier channel such that the media content carried on the media content carrier channel is received and may be processed by access subsystem 204.

In some examples, communication interface 402 may include multiple tuners such that media content carried on different media content carrier channels may be concurrently received for processing by the access subsystem 204. For example, communication interface 402 may include a first tuner configured to receive media content carried on an analog video signal and a second tuner configured to concurrently receive media content carried on a digital compressed signal.

While one or more tuners may be used to receive various types of media content-carrying signals transmitted by provider subsystem 202, additionally or alternatively, communication interface 402 may be configured to receive other types of signals (e.g., other types of media content carrying signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of signals, communication interface 402 may receive and forward the signals directly to other components of access subsystem 204 without the signals going through a tuner. For an IP-based signal, for example, communication interface 402 may function as an IP receiver.

Processor 404 generally represents any type or form of processing unit capable of processing data or interpreting, executing, and/or directing execution of one or more of the instructions, processes, and/or operations described herein. Processor 404 may direct execution of operations in accordance with one or more applications 406 or other computer-executable instructions such as may be stored in storage device 406 or another computer-readable medium. As an example, processor 404 may be configured to process data, including demodulating, decoding, and/or parsing data (e.g., data representative of media content received from provider subsystem 202 by communication interface 402), and encoding and modulating data for transmission by communication interface 402.

Storage device 406 may include one or more data storage media, devices, or configurations and may employ any type, form, and combination of data storage media and/or device. For example, storage device 406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 406. For example, data representative of one or more executable applications 416 configured to direct processor 404 to perform any of the operations described herein may be stored within storage device 406. In some examples, data may be arranged in one or more databases residing within storage device 406.

I/O module 408 may be configured to receive user input and provide user output and may include any hardware, firmware, software, or combination thereof supportive of input and output capabilities. For example, I/O module 408 may include one or more devices for capturing user input, including, but not limited to, a microphone, a keyboard or keypad, a touch screen component (e.g., touch screen display), a receiver (e.g., an RF or infrared receiver), and/or one or more input buttons.

I/O module 408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 408 is configured to provide graphical data to a display for presentation to a user. The graphical data may be representative of one or more graphical user interfaces ("GUIs"), GUI views, media content views, and/or any other view as may serve a particular application.

Program guide module 410 may be configured to maintain and operate on program guide data. As mentioned above, media content instances may be transmitted by provider subsystem 202 at scheduled transmission times and on certain media content carrier channels. To assist access subsystem 204 and/or a user of access subsystem 204 with reception of media content instances at appropriate scheduled transmission times and on appropriate media content carrier channels, program guide data may be received by communication interface 402 from provider subsystem 202 and/or from another source. The program guide data may be stored in storage device 406.

Media content recording module 412 may be configured to record data representative of media content to storage device 406. The recording of a media content instance is typically performed during a transmission time slot when data representative of the media content instance is received from provider subsystem 202 as described above. For example, during transmission of a media content instance from provider subsystem 202 to access subsystem 204 on a media content carrier channel, communication interface 402 may receive data representative of the media content instance on the media content carrier channel, and media content recording module 412 may direct that the received data representative of the media content instance be stored to storage device 406. Once stored, the data representative the media content instance may be accessed and processed as may suit a particular application, including providing data representative of the media content instance to a display for presentation to a user.

In some examples, user profile facility 102, presentation facility 104, interactive game tailoring facility 106, and/or storage facility 108 may be implemented by or within one or more components of access subsystem 204. For example, one or more applications 416 residing within storage device 406 may be configured to direct processor 404 to perform one or more processes or functions associated with monitoring facility 102, interaction profile facility 104, and/or presentation facility 106. Likewise, storage facility 108 may be implemented by or within storage device 406. For example, user profile data 110, media content data 112, and/or interactive game data 114 may be stored within storage device 406.

Figure 5:
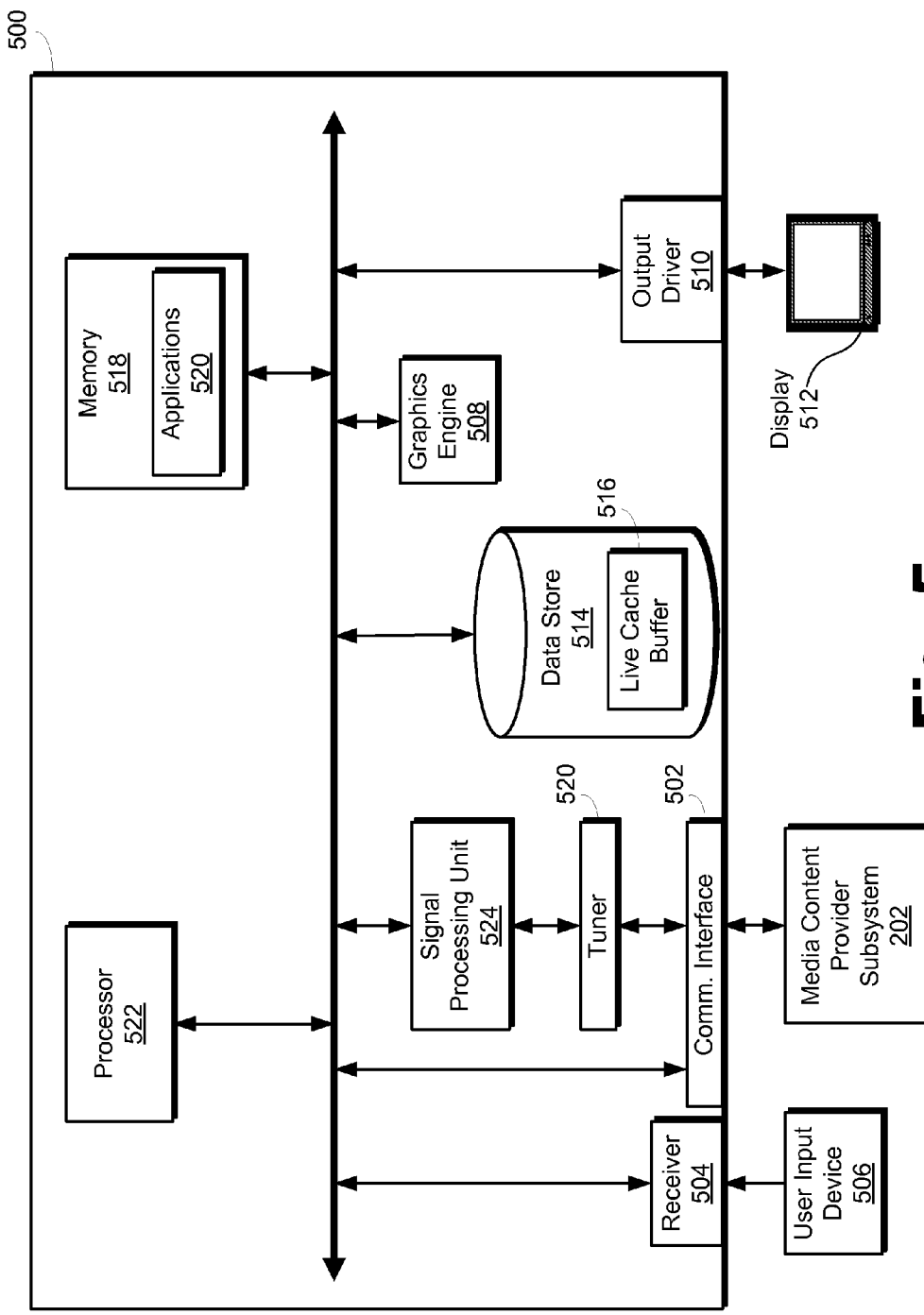
FIG. 5 illustrates an exemplary media content access device having the media content access subsystem of FIG. 4 implemented thereon according to principles described herein.

Access subsystem 204 and/or components of access subsystem 204 may be implemented as may suit a particular application. FIG. 5 illustrates an exemplary media content access device 500 having access subsystem 204 implemented thereon. Access device 500 may include one or more of the components of access subsystem 204 shown in FIG. 4 and may be configured to perform one or more of the processes and/or operations described herein. Access device 500 may include, but is not limited to, a set-top box, a media content processing device, a communications device, a mobile device (e.g., a mobile phone device), a handheld device, a personal computer, a phone device (e.g., Verizon Hub device), a personal-digital assistant device, a gaming device, a DVR device (e.g., a personal video recording PVR device), a television device, and/or any device configured to perform one or more of the processes and/or operations described herein.

As shown in FIG. 5, access device 500 may include a communication interface 502 configured to receive media content (e.g., media content) and/or data (e.g., metadata, program guide data, and/or any other data associated with media content) in any acceptable format from provider subsystem 202 or from any other suitable external source. Communication interface 502 may include any device, logic, and/or other technologies suitable for receiving signals and/or data representative of media content and/or other types of media content or data. Communication interface 502 may be configured to interface with any suitable communication media, protocols, and formats, including any of those mentioned above.

Access device 500 may also include a receiver 504 configured to receive user input signals from a user input device 506. User input device 506 may include, for example, a remote control device or any other suitable input device and may be configured to communicate with receiver 504 via a wireless link, electrical connection, or any other suitable communication link.

Figure 6:
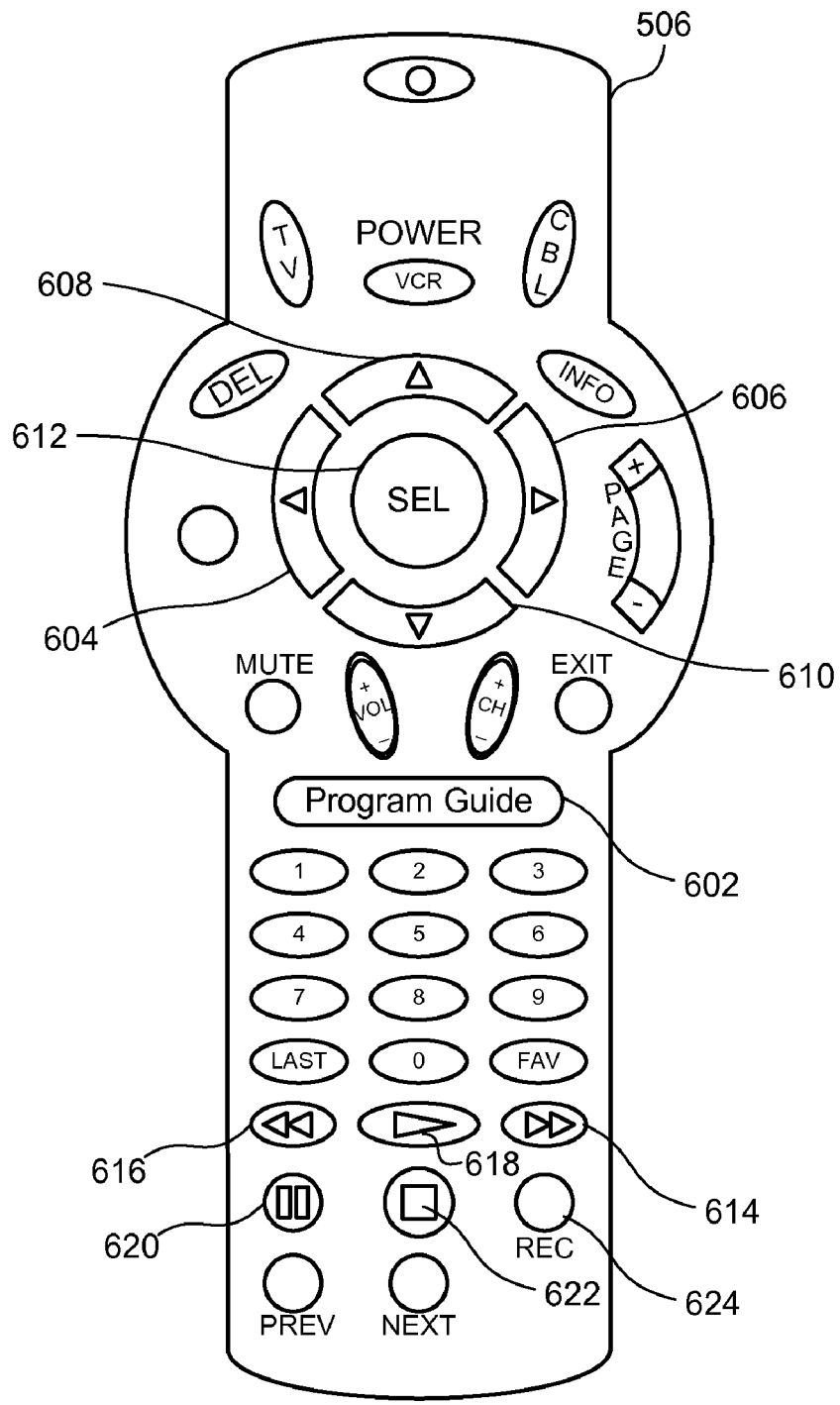
FIG. 6 illustrates an exemplary remote control user input device according to principles described herein.

FIG. 6 illustrates an exemplary remote control user input device 506. In some examples, input device 506 may be configured to facilitate a user controlling operations of access subsystem 204. For instance, a program guide button 602 may be configured to evoke a presentation of a program guide GUI on a display. A left button 604, a right button 606, an up button 608, a down button 610, and a select button 612 may be included and configured to facilitate a user evoking and/or navigating through various views, options, and GUIs displayed by a display. A fast forward or skip button 614, a reverse or rewind button 616, a play button 618, a pause button 620, a stop button 622, and/or a record button 624 may also be included and configured to facilitate a user navigating through, recording, and/or otherwise interacting with one or more media content instances. One or more of the buttons shown in FIG. 6 may be used to initiate and/or participate in an interactive game presented by presentation facility 104 and associated with a media content instance available via access device 500. Input device 506 shown in FIG. 6 is merely illustrative of one of the many different types of user input devices that may be used to provide input commands to access subsystem 204.

Returning to FIG. 5, access device 500 may include a graphics engine 508 and an output driver 510. Graphics engine 508 may be configured to generate graphics to be provided to output driver 510, which may be configured to interface with or drive a display 512. Output driver 510 may provide output signals to display 512, the output signals including graphical media content (e.g., media content and/or program guide media content) generated by graphics engine 508 and to be presented by display 512 for experiencing by a user. For example, output driver 510 may provide a data representative of a GUI including a program guide view to display 512 for presentation to the user. Graphics engine 508 and output driver 510 may include any combination of hardware, software, and/or firmware as may serve a particular application.

Data store 514 may include one or more data storage media, devices, or configurations and may employ any type, form, and combination of storage media. For example, data store 514 may include, but is not limited to, a hard drive, network drive, flash drive, magnetic disc, optical disc, or other non-volatile storage unit. Media content and/or data associated with media content may be temporarily and/or permanently stored in data store 514.

Data store 514 is shown to be included within access device 500 in FIG. 5 for illustrative purposes only. It will be understood that data store 514 may additionally or alternatively be located external to access device 500.

Data store 514 may include one or more live cache buffers 516. Live cache buffer 516 may additionally or alternatively reside in memory 518 or in a storage device external to access device 500. In some examples, media content data may be temporarily stored in live cache buffer 516 to facilitate viewing and/or recording of the media content.

Access device 500 may include memory 518. Memory 518 may include, but is not limited to, FLASH memory, random access memory ("RAM"), dynamic RAM ("DRAM"), other suitable computer-readable media, or any combination or sub-combination thereof. In some examples, one or more applications 520 configured to run on or otherwise be executed by access device 500 may reside in memory 518.

Access device 500 may include one or more tuners 520. Tuner 520 may be configured to selectively receive media content carried on a particular media content carrier channel such that the media content may be processed by access device 500. In some examples, media content received by tuner 520 may be temporarily buffered, or stored, in the live cache buffer 516. If there are multiple tuners 520, there may be a live cache buffer 516 corresponding to each of the tuners 520.

While tuner 520 may be used to receive certain media content-carrying signals transmitted by provider subsystem 202, access device 500 may be configured to receive other types of media content signals (including media content signals and/or program guide data signals) from provider subsystem 202 and/or one or more other sources without using a tuner. For example, provider subsystem 202 may transmit digital streams of data packets (e.g., Internet Protocol ("IP") based data packets) that can be received without using a tuner. For such types of media content signals, communication interface 502 may receive and forward the signals directly to other components of access device 500 (e.g., processor 522 or signal processing unit 524, described in more detail below) without the signals going through tuner 520. For an IP-based signal, for example, signal processing unit 524 may function as an IP receiver.

Access device 500 may include at least one processor, such as processor 522, configured to control and/or perform one or more operations of access device 500. Access device 500 may also include a signal processing unit 524 configured to process incoming media content. Signal processing unit 524 may be configured, for example, to demodulate and parse encoded digital media content. In some examples, access device 500 may include one or more signal processing units 524 corresponding to each of the tuners 520.

Figure 7:
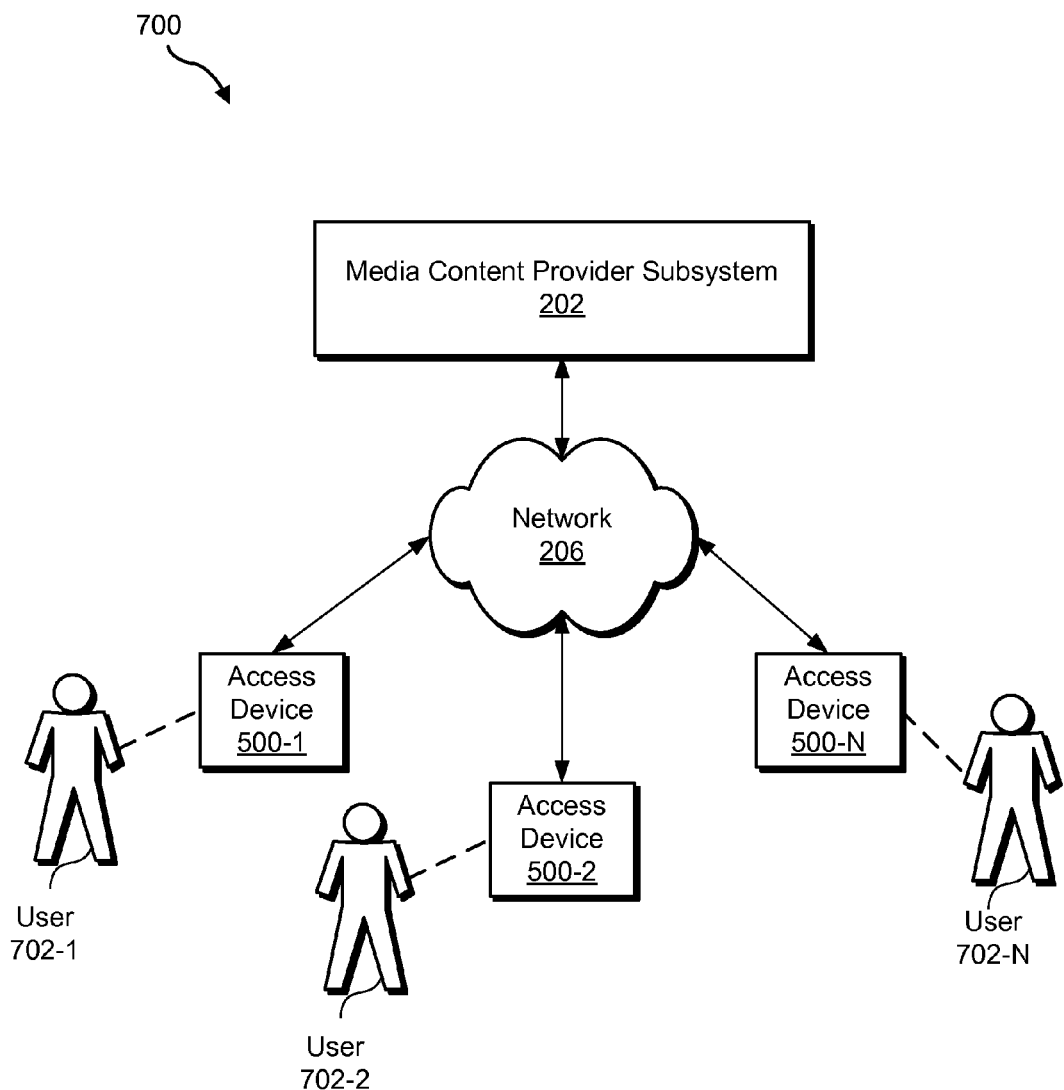
FIG. 7 illustrates an exemplary implementation of the system of FIG. 1 according to principles described herein.

System 100 may additionally or alternatively be configured to support interaction with multiple users. For example, FIG. 7 shows an exemplary implementation 700 of system 100 wherein multiple users 702-1 through 702-N (collectively referred to herein as "users 702") may utilize one or more access devices 500 (e.g., access devices 500-1 through 500-N) to communicate with provider subsystem 202 over network 206. As will be described in more detail below, presentation facility 104 may be configured to present a media content instance and/or an interactive game associated with the media content instance to one or more of users 702 via one or more of access devices 500.

In some examples, a user may desire to participate in (e.g., play) an interactive game associated with a media content instance (e.g., a television program) that the user watches or otherwise experiences. For example, the user may be watching a television program and desire to participate in an interactive trivia game associated with the program while watching the program. The user may further desire to participate in the interactive game with one or more friends or other users. For example, a group of friends may desire to compete against each other in an interactive game associated with a television sitcom program or sports broadcast. To this end, the methods and systems described herein facilitate presentation and tailoring of an interactive game associated with a media content instance available via access subsystem 204 to one or more users.

Figure 8:
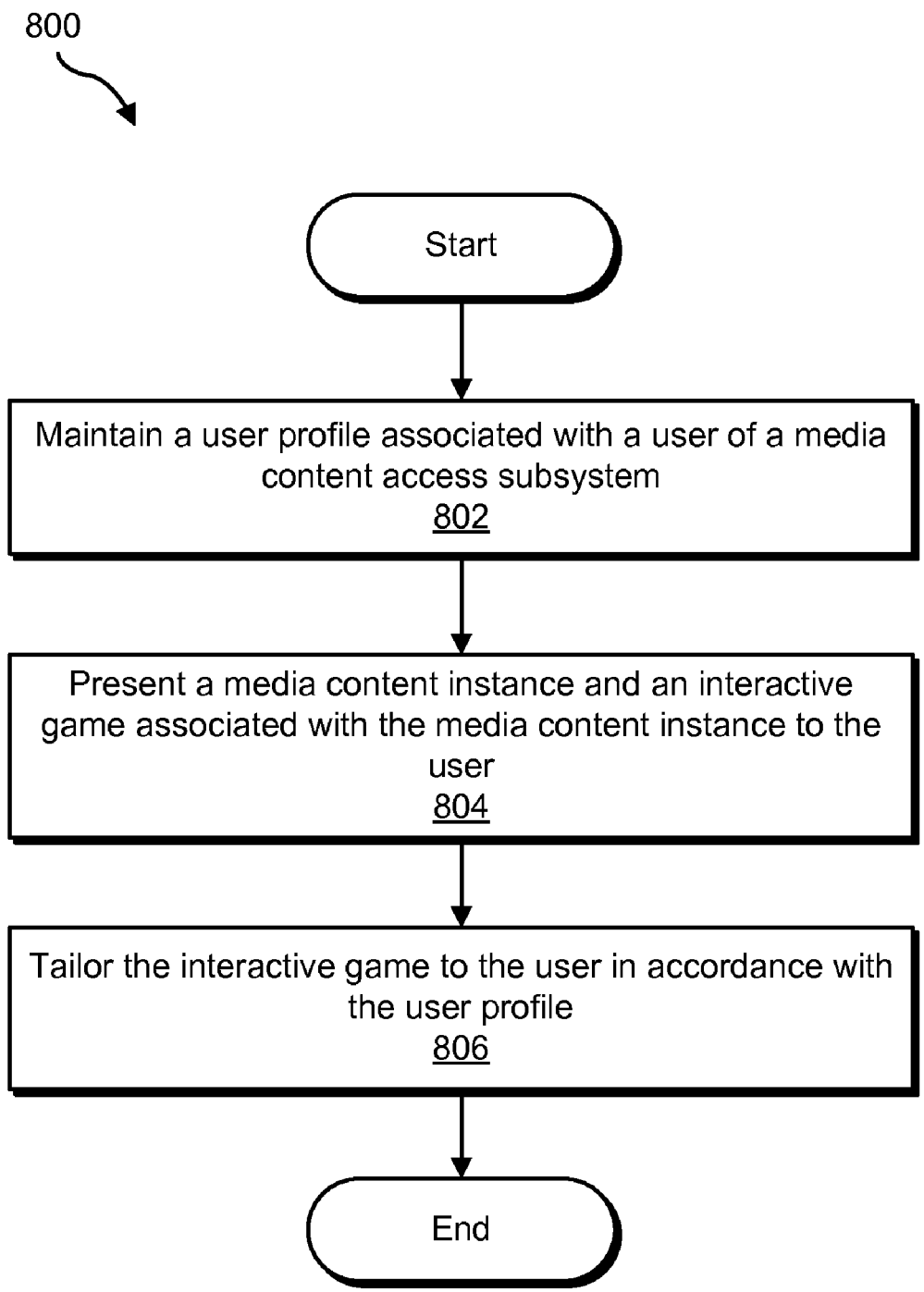
FIG. 8 illustrates an exemplary method of tailoring an interactive game associated with a media content instance to a user of a media content access subsystem according to principles described herein.

FIG. 8 illustrates an exemplary method 800 of tailoring an interactive game associated with a media content instance to a user of a media content access subsystem. While FIG. 8 illustrates exemplary steps according to one embodiment, other embodiments may omit, add to, reorder, and/or modify any of the steps shown in FIG. 8.

In step 802, a user profile associated with a user of a media content access subsystem is maintained. For example, user profile facility 102 may be configured to maintain a user profile associated with a user of access subsystem 204 by generating the user profile, updating the user profile, and/or storing the user profile within storage facility 108.

In some examples, the user profile maintained in step 802 is based at least in part on an interaction between the user and access subsystem 204. To this end, user profile facility 102 may be configured to monitor an interaction of the user with access subsystem 204 by detecting one or more "interaction events" performed by or otherwise associated with the user. Exemplary interaction events that may be performed by or otherwise associated with a user include, but are not limited to, viewing or otherwise experiencing a media content instance, participating in an interactive game associated with a media content instance, fast forwarding through media content (e.g., skipping one or more advertisements included within the media content), rewinding or going back within media content, scheduling a recording of a media content instance, purchasing a media content instance that is "on demand," flagging a media content as a "favorite" or as something that the user dislikes, rating a media content instance, changing a media content channel, selecting one or more options available within a program guide or other GUI displayed by access subsystem 204, powering access subsystem 204 on or off, and/or any other interaction event associated with access subsystem 204 as may serve a particular application.

To illustrate, a user profile corresponding to a user may include or reference a viewing log that represents a viewing history of a user and/or an interactive game participation log that represents a participation history of a user in interactive games presented by presentation facility 104. User profile facility 104 may be configured to update the user profile by updating the viewing log each time the user watches or otherwise accesses a television program or the like via access subsystem 104. User profile facility 104 may be further configured to update the user profile by updating the interactive game participation log each time the user participates in an interactive game associated with a media content instance. User profile facility 104 may be further configured to update the user profile with data representative of any other interactive event as may serve a particular application. In this manner, as will be described in more detail below, a user profile associated with a user may be used by interactive game tailoring facility 106 to determine one or more habits and/or tendencies of the user so that an interactive game may be tailored to the user accordingly.

In some examples, the user profile may be dynamically updated as interaction events are detected over time. For example, each time a user tunes to a particular media content instance, a user profile corresponding to the user may be updated to reflect that the user has tuned to the media content instance. In this manner, a user profile corresponding to a user may include data representative of a media content instance that the viewer is watching or otherwise experiencing at any given moment. Dynamic updating of the user profile may further facilitate constant improvement in how one or more interactive games are tailored to the user.

In some examples, a user profile corresponding to a user may represent one or more personal traits and/or preferences of the user. For example, a user profile may include data representative of a user's age, gender, income level, profession, family status, nationality, preferred genre of media content, etc. Such information may be used to further tailor an interactive game to a user, as will be described in more detail below.

The user profile may be maintained by user profile facility 102 in accordance with any suitable heuristic or algorithm. In some examples, data representative of detected interaction events, timestamps associated with the detected interaction events, and/or any other data associated with the interaction events (e.g., metadata corresponding to media content being presented during an occurrence of the interaction events) may be processed by user profile facility 104 to generate and/or update the user profile. Information input by the user (e.g., personal trait information) may additionally or alternatively be processed by user profile facility 104 to generate and/or update the user profile.

In some examples, user profile facility 102 is configured to maintain one or more additional user profiles corresponding to one or more additional users. In this manner, as will be described in more detail below, an interactive game may be tailored to a user in accordance with multiple user profiles.

In step 804, a media content instance and an interactive game associated with the media content instance are presented to the user associated with the user profile maintained in step 802. In some examples, access subsystem 204, with presentation facility 104 at least partially implemented thereon, is configured to present the media content instance and the interactive game associated with the media content instance.

In some examples, access subsystem 204 may present a media content instance and/or an interactive game associated with the media content instance to a user by displaying the media content instance and/or the interactive game on a display screen that is viewed by the user. The display screen may be a part of display 512, for example.

Figure 9:
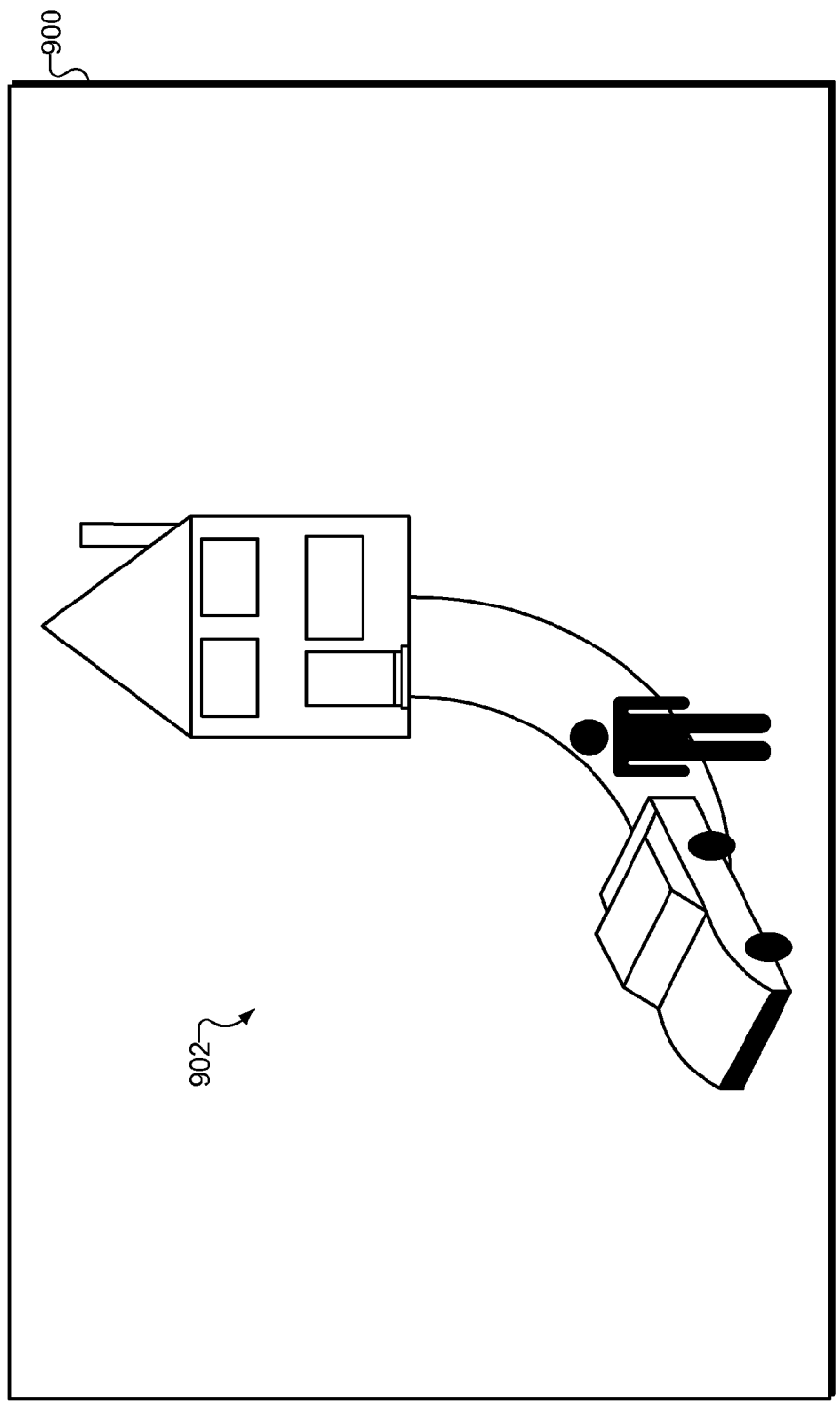
FIG. 9 shows an exemplary display screen with a scene of an exemplary media content instance displayed thereon according to principles described herein.

To illustrate, FIG. 9 shows an exemplary display screen 900 with an exemplary media content instance 902 displayed thereon. Media content instance 902 may include a broadcast television program, a movie, an on-demand program, or any other media content instance described herein. For illustrative purposes only, it will be assumed that media content instance 902 includes an episode of the television program called "Seinfeld."

In some examples, a user of access subsystem 204 may desire to participate in an interactive game associated with a media content instance presented by access subsystem 204. For example, a user may desire to participate in an interactive game associated with the media content instance 902 shown in FIG. 9. To this end, the user may input a user input command configured to direct access subsystem 204 to present an interactive game associated with media content instance 902. The user input command may include any command as may serve a particular application. For example, a user may select a button located on user input device 506, select an option displayed within one or more GUIs presented by access subsystem 204, and/or perform any other action to initiate an interactive game associated with media content instance 902 as may serve a particular application.

Figure 10:
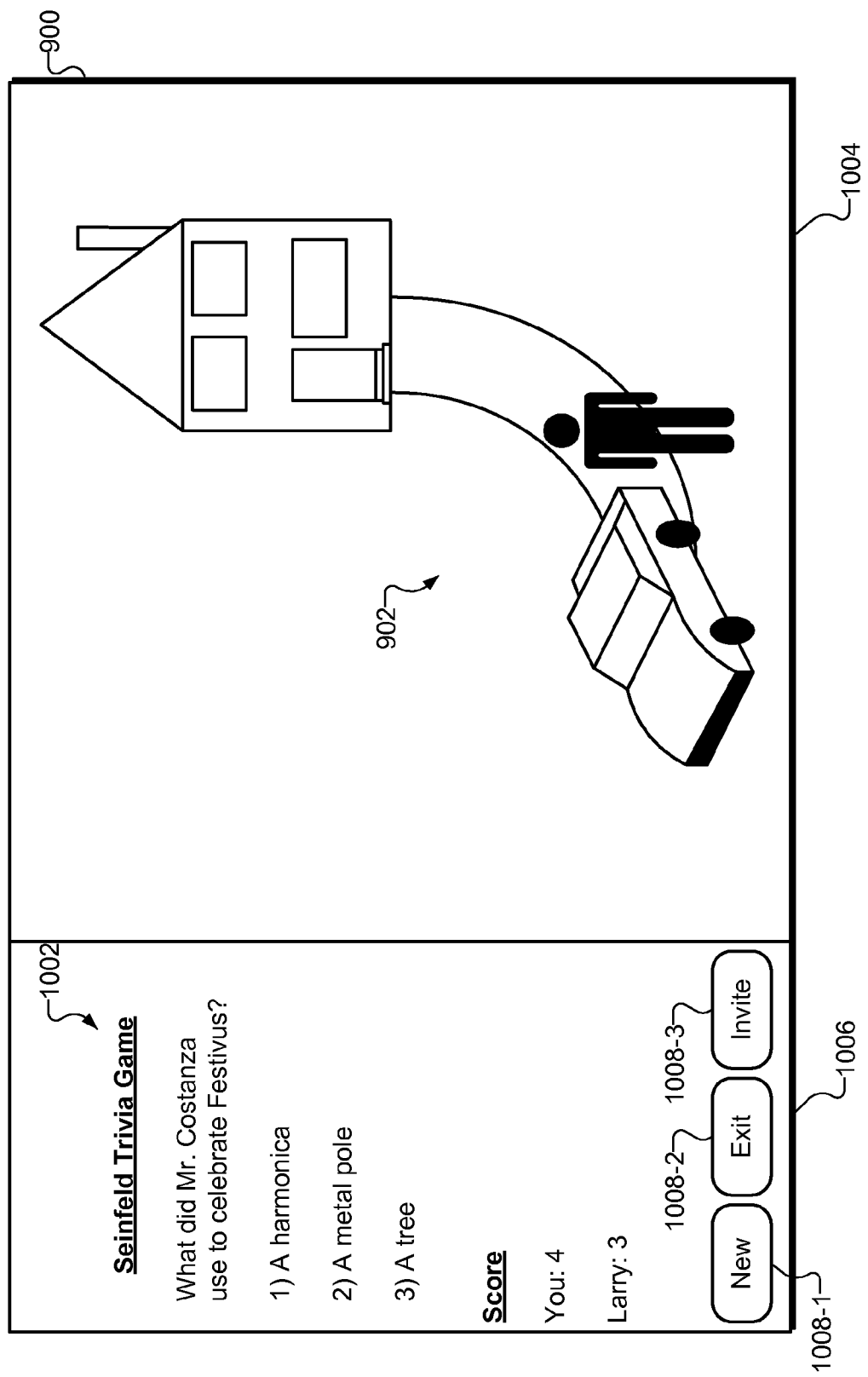
FIG. 10 shows that a media content instance and an interactive game associated with media content instance may be displayed concurrently on a display screen according to principles described herein.

In response to the user input command, access subsystem 204 may present an interactive game associated with media content instance 902. In some examples, the interactive game is presented concurrently with media content instance 902. For example, FIG. 10 shows that media content instance 902 and an interactive game 1002 associated with media content instance 902 may be displayed concurrently on display screen 900. As shown in FIG. 10, display screen 900 may be divided into viewing panes 1004 and 1006 in order to facilitate concurrent display of media content instance 902 and interactive game 1002. While FIG. 10 shows media content instance 902 displayed within viewing pane 1004 and interactive game 1002 displayed within viewing pane 1006, it will be recognized that media content instance 902 and interactive game 1002 may be displayed within any portions of display screen 900 as may serve a particular application. Moreover, as will be described in more detail below, a media content instance and an interactive game associated with the media content instance may alternatively be displayed on separate display screens or during different time periods on the same display screen.

Interactive game 1002 may include any type of game associated with media content instance 902. For example, as shown in FIG. 10, interactive game 1002 may include an interactive trivia game based on Seinfeld. Additional or alternative interactive games associated with media content instance 902 may be presented to the user (e.g., displayed on display screen 900) as may serve a particular application.

As shown in FIG. 10, interactive game 1002 may be configured to present one or more trivia questions associated with Seinfeld to a user of access subsystem 204. The user may answer the trivia questions by selecting an input button on user input control 506 or by performing any other suitable action as may serve a particular application. For example, a user may press one of the number keys on user input device 506 to select one of the three possible answers displayed in FIG. 10.

FIG. 10 shows that one or more selectable options 1008 (e.g., options 1008-1 through 1008-3) associated with interactive game 1002 may be displayed within viewing pane 1006. A user may select one or more of these options 1008 to start a new interactive game, exit interactive game 1002, invite one or more other users to participate in interactive game 1002, and/or access any other option associated with interactive game 1002 as may serve a particular application.

As will be described in more detail below, an interactive game presented by access subsystem 204 may be played by multiple users at the same time. These users may desire to compete one with another. To this end, one or more facilities within system 100 may be configured to keep track of the user's score or otherwise track a performance of the user in the interactive game 1002. In this manner, the performance of the user may be compared to how other users perform in the game. For example, as shown in FIG. 10, system 100 may be configured to keep a running score of how many trivia questions each of a plurality of participants answers correctly.

Returning to FIG. 8, in step 806, the interactive game presented in step 804 is tailored to the user in accordance with the user profile maintained in step 802. Step 802 may be performed by interactive game tailoring facility 106, for example. A number of ways in which an interactive game may be tailored to a user by interactive game tailoring facility 106 will now be described.

In some examples, interactive game tailoring facility 106 may tailor the type and/or content of an interactive game presented to a user based on one or more personal traits and/or preferences of the user as defined in a user profile associated with the user. For example, a particular user may be 42 years old, male, a resident of Wisconsin, and have an interest in football. Another user may be 19 years old, female, a resident of Colorado, and have an interest in dance. Both users may be watching a Green Bay Packers versus Denver Broncos football game on separate access devices 500 and may select an option to play an interactive game associated with the football game. Interactive game tailoring facility 106 may present different interactive games to each user based on their respective user profiles. For example, interactive game tailoring facility 106 may be configured to present a trivia game containing questions about Green Bay Packers trivia to the first user and an instructional dance move game involving routines performed by the Denver cheerleaders to the second user.

Additionally or alternatively, interactive game tailoring facility 106 may utilize a user profile of a user to prevent certain content within an interactive game from being presented to a user. For example, a particular user desiring to participate in an interactive game associated with a particular media content instance may be ten years old. Interactive game tailoring facility 106 may tailor the content of the interactive game to the user to ensure that inappropriate content for minors is not presented to the user.

In some examples, interactive game tailoring facility 106 may tailor an interactive game presented to a user based on one or more interaction events as defined in a user profile associated with the user. For example, the difficulty level of an interactive game associated with a particular media content instance may be modified based on the number of times the user has viewed the media content instance as defined in a viewing log included within the user profile of the user. To illustrate, an interactive trivia game associated with the television program "Star Trek" may be made relatively more difficult for someone who has repeatedly watched each episode of the program.

In some examples, interactive game tailoring facility 106 may tailor an interactive game to a user in accordance with one or more user profiles associated with one or more other users. For example, a group of two or more users of access subsystem 204 may desire to play an interactive game together during the broadcast of a television show that they each watch. Each user within the group may reside at a distinct location and may watch the television show on distinct access devices 500. During the broadcast of the television show, each user may transmit a user input command to his or her respective access device 500 to initiate an interactive game associated with the television show. As will be described in more detail below, one or more of the users may "invite" the other users to participate in the same interactive game. Once invited, each user may participate in the interactive game while concurrently watching the broadcast of the television show.

In some examples, the interactive game may be tailored to the particular group of users in accordance with a user profile corresponding to each of the users within the group. For example, in the case of an interactive trivia game, the questions designated for presentation to the users within the group may be selected in accordance with one or more viewing habits, tendencies, personal traits and/or preferences, and/or other characteristics of the users as defined in their respective user profiles. Hence, the interactive game may be specific to the group of users.

In some examples, a user participating in a particular interactive game associated with a media content instance may desire to invite one or more additional users to participate in (e.g., join) the interactive game. To this end, interactive game tailoring facility 106 and/or any other facility within system 100 may be configured to automatically determine a list of one or more additional users who are likely to accept an invitation to join the interactive game in accordance with one or more user profiles associated with the one or more additional users. The list may be presented by the access subsystem 204 to the user so that the user may invite one or more of the users in the list to join the interactive game.

Figure 11:
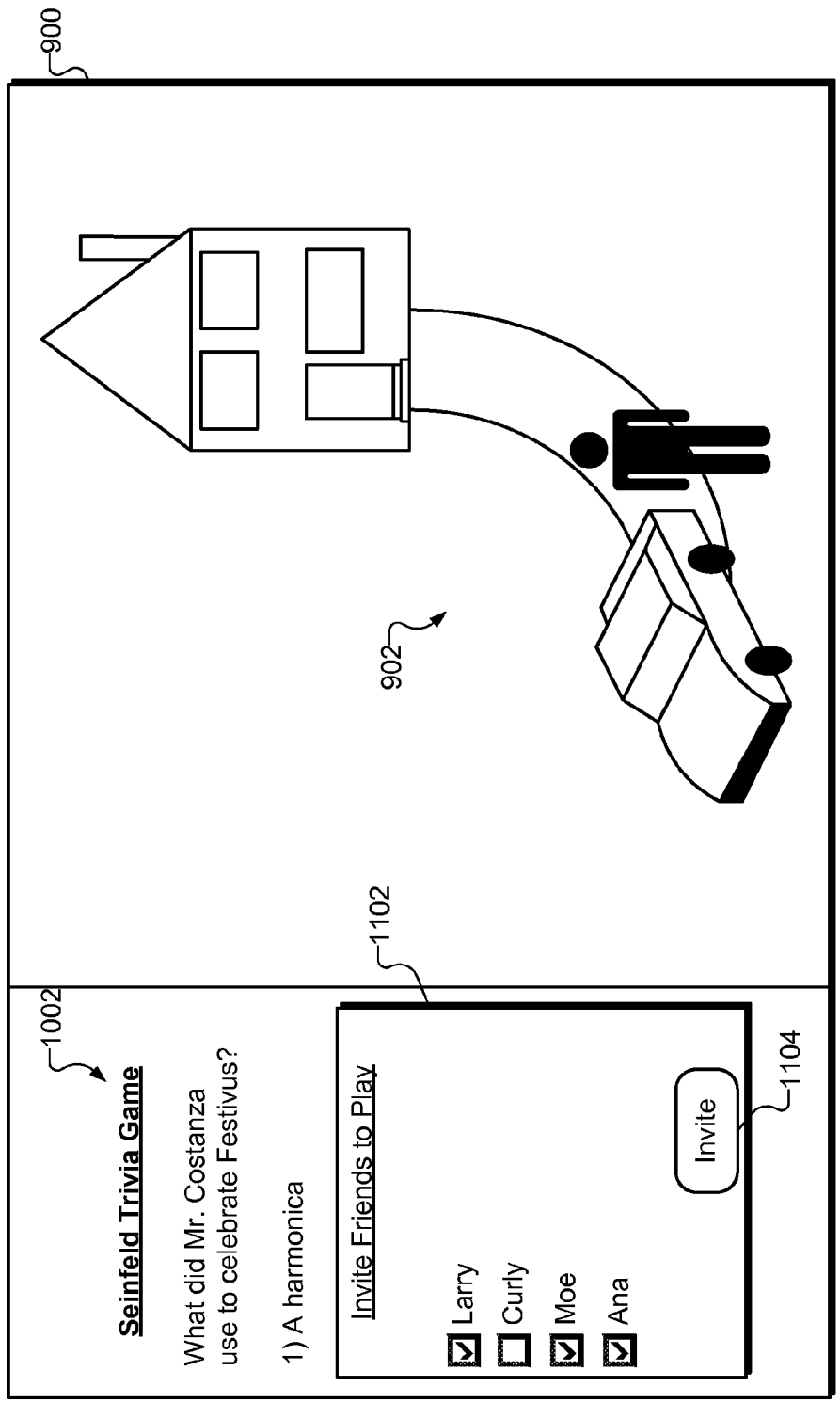
FIG. 11 shows a pop-up window containing a list of users who are likely to accept an invitation from a user of a media content access subsystem to join an interactive game according to principles described herein.

To illustrate, FIG. 11 shows a pop-up window 1102 containing a list of users who are likely to accept an invitation from a user of access subsystem 204 to join interactive game 1002 and that may be displayed within display screen 900 in response to a user generated request to invite one or more additional users to participate in interactive game 1002. The list of users may alternatively be displayed within any other type of GUI as may serve a particular application.

The list of users may be selected from a group of users designated as friends or contacts of the user of access subsystem 204 or from any other group of users (e.g., unknown users) as may serve a particular application. In some examples, the list of users may be selected from a group of users each associated with a particular subscriber network.

The list of users who are likely to accept an invitation from the user of access subsystem 204 may be determined in accordance with the user profiles associated with the users. For example, interactive game tailoring facility 106 may determine the list of users displayed within pop-up window 1102 based on viewing habits or tendencies of the users as defined in the user profiles, interactive game participation habits or tendencies as defined in the user profiles, personal traits and/or preferences of the users as defined in the user profiles, and/or in accordance with any other information included within the user profiles.

To illustrate, the list of users shown in pop-up window 1102 may be selected because their user profiles indicate that they are currently watching Seinfeld and/or because they have a tendency to play trivia games based on television sitcoms. The list of users may be alternatively determined in accordance with any other user profile based criteria as may serve a particular application. It will be recognized that the list of users may alternatively be determined manually by the user of access subsystem 204.

In some examples, a user may select one or more of the users within the list of users displayed within pop-up window 1102 to invite those users to participate in interactive game 1002. For example, FIG. 11 shows that users named "Larry," "Moe," and "Ana" have been selected to receive invitations to participate in interactive game 1002. In some examples, interactive game tailoring facility 106 may transmit data representative of an invitation to join the interactive game to the users selected from the list of users displayed within pop-up window 1102 in response to a user input command (e.g., selection of "invite" button 1104) received from the user of access subsystem 204 to invite the users. The invitation may be transmitted and presented to the invited users in any suitable manner. For example, the invited users may be presented with a selectable link to the interactive game 1002, an email, an instant message, and/or any or other notification as may serve a particular application. Upon accepting the invitation, the invited user is presented with interactive game 1002.

As mentioned, a media content instance and an interactive game associated with the media content instance may be concurrently presented to a user of access subsystem 204. For example, the media content instance and the associated interactive game may be concurrently displayed on a single display screen, as illustrated in FIG. 10. Alternatively, a media content instance and an associated interactive game may be concurrently presented to a user by being displayed on separate display screens.

For example, FIG. 12 illustrates an exemplary configuration wherein media content instance 902 and interactive game 1002 are displayed on distinct display screens 900 and 1202, respectively. Display screen 900 may be associated with a set-top box, for example, and may be configured to display media content instance 902. Display screen 1202 may be a part of a mobile phone 1204 or other type of access device 500, for example, and may be configured to display interactive game 1002.

In some alternative examples, a media content instance and an interactive game associated with the media content instance may be presented to a user during different time periods. For example, an interactive game associated with a media content instance may be presented to a user after the media content instance has been presented to the user.

In some examples, interactive game tailoring facility 106 may be configured to acquire information related to a media content instance being presented to a user and base an interactive game associated with the media content instance at least in part on the acquired information. For example, a trivia question presented within an interactive game may be based at least in part on the acquired information.

Interactive game tailoring facility 106 may be configured to acquire the information in any suitable manner and from any suitable source. For example, interactive game tailoring facility 106 may use at least one metadata value associated with a media content instance to search for the information related to the media content instance. The information may be acquired from a website (e.g., Wikipedia.com or the like), an information database, and/or any other source as may serve a particular application.

Figure 13:
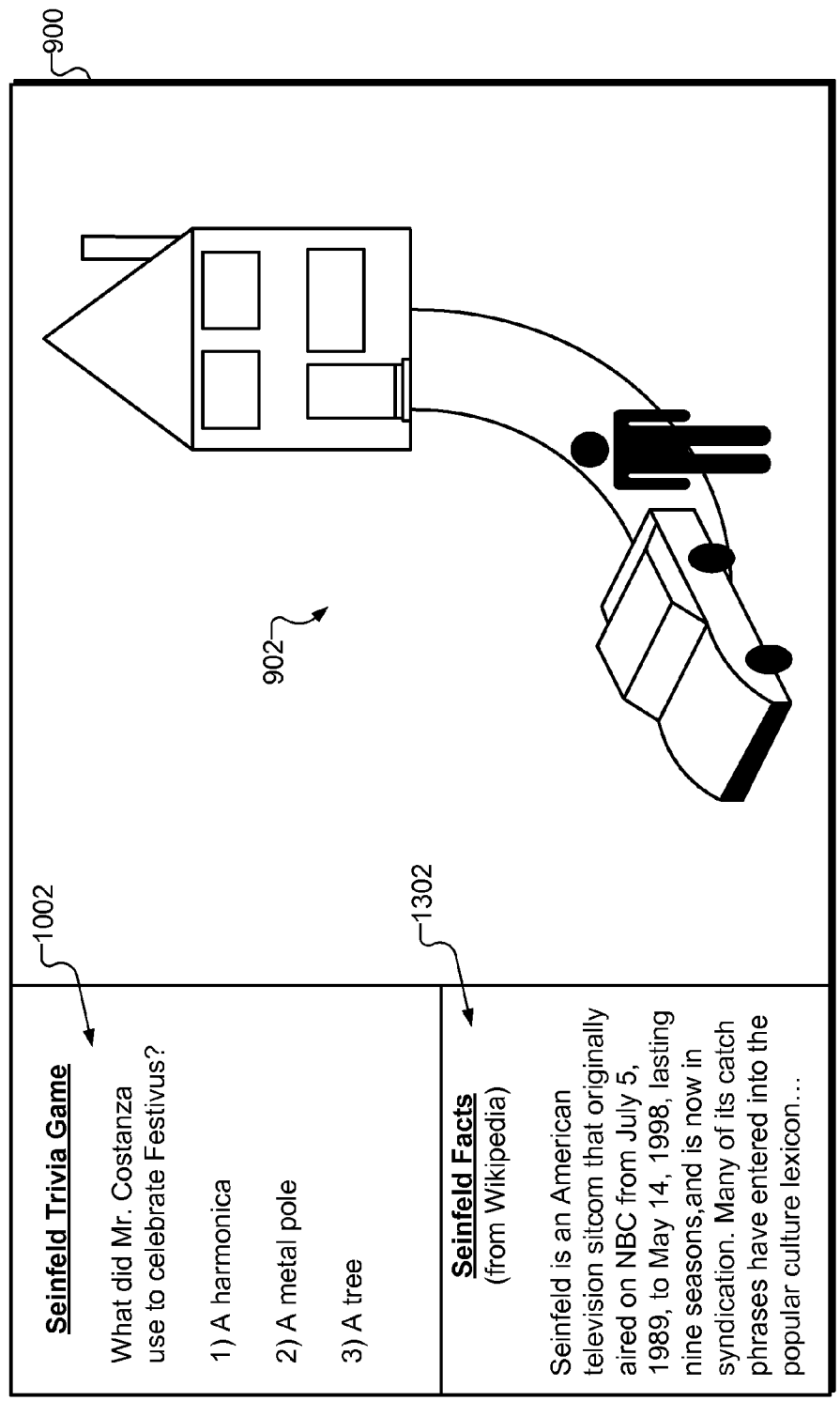
FIG. 13 illustrates an exemplary configuration wherein a media content instance, an interactive game, and information related to the media content instance are displayed concurrently on a display screen according to principles described herein.

In some examples, the information may be presented to a user of access device 204 along with the media content instance and the interactive game. For example, FIG. 13 illustrates an exemplary configuration wherein media content instance 902, interactive game 1002, and information 1302 related to media content instance 902 are displayed concurrently on display screen 900. As shown in FIG. 13, information 1302 may include a description of media content instance 900 acquired from a website such as Wikipedia.com. It will be recognized that information 1302 may alternatively be acquired from any other source as may serve a particular application.

Figure 14:
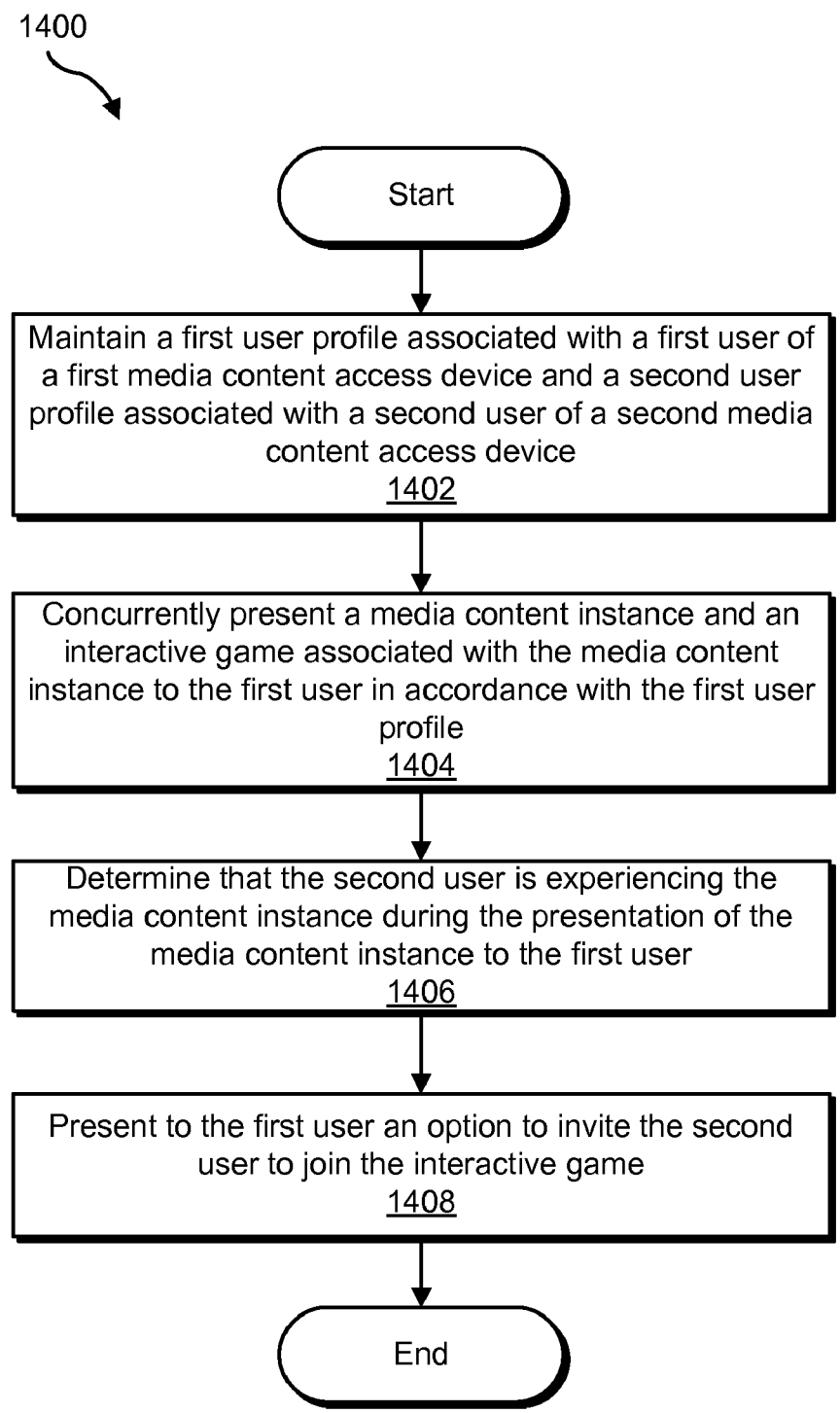
FIG. 14 illustrates an exemplary method of tailoring an interactive game associated with a media content instance to a user of a media content access device in accordance with a user profile associated with the user according to principles described herein.

FIG. 14 illustrates an exemplary method 1400 of tailoring an interactive game associated with a media content instance to a user of a media content access device in accordance with a user profile associated with the user. While FIG. 14 illustrates exemplary steps according to one embodiment, other embodiments may omit, add to, reorder, and/or modify any of the steps shown in FIG. 14.

In step 1402, a first user profile associated with a first user of a media content access device and a second user profile associated with a second user of a second media content access device are maintained. The user profiles may be maintained in any of the ways described herein.

In step 1404, a media content instance and an interactive game associated with the media content instance are presented to the user in accordance with the first user profile. The media content instance and the interactive game may be presented to the user in any of the ways described herein.

In step 1406, a determination is made that the second user is experiencing the media content instance during the presentation of the media content instance to the first user. The determination may be made in any of the ways described herein.

In step 1408, an option is presented to the first user to invite the second user to join the interactive game. The option may be presented in any of the ways described herein.

As detailed above, the methods and systems described herein facilitate tailoring of an interactive game associated with a media content instance to a user of a media content access subsystem. As an example, an exemplary method includes maintaining a user profile associated with a user of a media content access subsystem, presenting, by the media content access subsystem, a media content instance and an interactive game associated with the media content instance to the user, and tailoring the interactive game to the user in accordance with the user profile.

Another exemplary method includes maintaining a first user profile associated with a first user of a first media content access device and a second user profile associated with a second user of a second media content access device, concurrently presenting, by the first media content access device, a media content instance and an interactive game associated with the media content instance to the first user in accordance with the first user profile, determining that the second user is experiencing the media content instance during the presentation of the media content instance to the first user, and presenting to the first user, by the first media content access device, an option to invite the second user to join the interactive game.

An exemplary system includes a user profile facility configured to maintain a user profile associated with a user of a media content access device, a presentation facility configured to present a media content instance and an interactive game associated with the media content access device to the user via the media content access device, and an interactive game tailoring facility selectively and communicatively coupled to the user profile facility and the presentation facility and configured to tailor the interactive game to the user in accordance with the user profile.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    maintaining, by a media content access system, a user profile associated with a user of a media content access device and a user profile associated with an additional user of an additional media content access device;
    detecting, by the media content access system, one or more interaction events performed by the user with respect to the media content access device;
    dynamically updating, by the media content access system as the one or more interaction events are performed, the user profile associated with the user to account for the one or more interaction events;
    receiving, by the media content access system during a presentation of a media content instance by the media content access device, a request from the user to participate in an interactive game associated with the media content instance;
    presenting, by the media content access system, the interactive game associated with the media content instance to the user concurrently with the presentation of the media content instance in response to the request received from the user;
    presenting, by the media content access system, the interactive game to the additional user concurrently with the presentation of the interactive game to the user; and
    automatically tailoring, by the media content access system, the interactive game to the user in accordance with the dynamically updated user profile associated with the user and in accordance with the user profile associated with the additional user.

2. The method of claim 1, further comprising presenting the interactive game associated with the media content instance to the user after the presentation of the media content instance.

3. The method of claim 1, wherein the presenting comprises displaying the interactive game on a display screen configured to display the media content instance.

4. The method of claim 3, wherein the displaying comprises displaying the interactive game on the display screen while the media content instance is being displayed on the display screen.

5. The method of claim 1, wherein the tailoring comprises modifying, by the media content access system, at least one of a difficulty level, a content, a type, and a duration of the interactive game in accordance with the user profile associated with the user and in accordance with the user profile associated with the additional user.

6. The method of claim 1, further comprising:
tailoring, by the media content access system, the interactive game to the additional user in accordance with the user profile associated with the ether user and the user profile associated with the additional user.

7. The method of claim 1, wherein the interactive game is configured to be played between the user and the additional user.

8. The method of claim 1, further comprising:
determining, by the media content access system, a list of one or more additional users who are likely to accept an invitation to join the interactive game in accordance with one or more user profiles associated with the one or more additional users; and
presenting, by the media content access system, the list of the one or more additional users to the user.

9. The method of claim 8, wherein the tailoring further comprises transmitting data representative of an invitation to join the interactive game to at least one user selected from the one or more additional users in response to a user input command received from the user.

10. The method of claim 1, wherein the interactive game is based on information associated with at least one actor within the media content instance.

11. The method of claim 1, further comprising:
acquiring, by the media content access system, information related to the media content instance from at least one website; and
basing, by the media content access system, the interactive game at least in part on the acquired information.

12. The method of claim 11, wherein the basing of the interactive game at least in part on the acquired information comprises generating at least one trivia question presented within the interactive game in accordance with the acquired information.

13. The method of claim 11, wherein the acquiring of the information associated with the media content instance comprises using at least one metadata value associated with the media content instance to search for the information related to the media content instance.

14. The method of claim 1, tangibly embodied as computer-executable instructions on at least one non-transitory computer-readable medium.

15. The method of claim 1, wherein:
the receiving of the request by the media content access system comprises receiving, during the presentation of the media content instance by the media content access device, a request from the user to initiate a new interactive game associated with the media content instance; and
the presenting further comprises initiating the new interactive game associated with the media content instance to enable the user to participate in the new interactive game.

16. The method of claim 1, wherein the tailoring comprises modifying a difficulty level of the interactive game in accordance with the user profile associated with the user.

17. The method of claim 16, wherein the modifying comprises modifying the difficulty level of the interactive game based on a number of times the user has experienced the media content instance.

18. A method comprising:
maintaining, by a media content access system, a first user profile associated with a first user of a first media content access device and a second user profile associated with a second user of a second media content access device;
detecting, by the media content access system, one or more interaction events performed by the first user with respect to the first media content access device and one or more interaction events performed by the second user with respect to the second media content access device;
dynamically updating, by the media content access system as the one or more interaction events with respect to the first media content access device are performed by the first user and as the one or more interaction events with respect to the second media content access device are performed by the second user, the first user profile to account for the interaction events performed by the first user and the second user profile to account for the interaction events performed by the second user;
receiving, by the media content access system during a presentation of a media content instance via the first media content access device, a request from the first user to participate in an interactive game associated with the media content instance;
presenting, by the media content access system, the interactive game associated with the media content instance to the first user concurrently with the presentation of the media content instance via the first media content access device in response to the request received from the first user;
determining, by the media content access system, that the second user is experiencing the media content instance via the second media content access device during the presentation of the media content instance to the first user via the first media content access device;
presenting, by the media content access system in response to the determining that the second user is experiencing the media content instance via the second media content access device, an option to the first user to invite the second user to join the interactive game;
transmitting, by the media content access system in response to a selection of the option by the first user, data representative of an invitation to join the interactive game to the second media content access device;
presenting, by the media content access system in response to an acceptance of the invitation by the second user, the interactive game to the second user; and
automatically tailoring, by the media content access system, the interactive game to the first user and to the second user in accordance with the dynamically updated first and second user profiles.

19. A system comprising:

a user profile facility configured to:
- maintain a user profile associated with a user of a media content access device and a user profile associated with an additional user of an additional media content access device;
- detect one or more interaction events performed by the user with respect to the media content access device; and
- dynamically update, as the one or more interaction events are performed, the user profile associated with the user to account for the one or more interaction events;

a presentation facility configured to:
- present a media content instance to the user via the media content access device;
- receive, during presentation of the media content instance, a request from the user to participate in an interactive game associated with the media content instance; and
- present the interactive game associated with the media content instance to the user concurrently with the presentation of the media content instance via the media content access device in response to the request received from the user;
- present the interactive game to the additional user via the additional media content access device concurrently with the presentation of the interactive game to the user; and an interactive game tailoring facility selectively and communicatively coupled to the user profile facility and the presentation facility and configured to automatically tailor the interactive game to the user in accordance with the dynamically updated user profile associated with the user and in accordance with the user profile associated with the additional user.

20. The system of claim 19, wherein:

the interactive game tailoring facility is further configured to tailor the interactive game to the additional user in accordance with the user profile associated with the additional user.

21. The system of claim 19, wherein:

the interactive game tailoring facility is further configured to determine a list of one or more additional users who are likely to accept an invitation to join the interactive game in accordance with one or more user profiles associated with the one or more additional users; and the presentation facility is further configured to present the list of the one or more additional users to the user via the media content access device.

* * * * *